United States Patent [19]

Kanbe et al.

[11] Patent Number: 5,238,097

[45] Date of Patent: Aug. 24, 1993

[54] SERPENTINE-TYPE MERCHANDISE STORING AND DISPENSING COLUMN FOR AUTOMATIC VENDING MACHINE

[75] Inventors: Tohru Kanbe, Ota; Kiyoaki Yoshii; Hirokatsu Kaneko, both of Isesaki; Takeshi Onda, Ashikaga; Masauki Taguchi, Isesaki; Masayuki Toriba, Honjyo, all of Japan

[73] Assignee: Sanden Corp., Isesaki, Japan

[21] Appl. No.: 962,961

[22] Filed: Oct. 16, 1992

[30] Foreign Application Priority Data

Oct. 17, 1991 [JP] Japan .................. 3-84631[U]

[51] Int. Cl.⁵ ................................ B65G 11/00
[52] U.S. Cl. ........................ 193/27; 221/67; 221/312 R
[58] Field of Search ........... 193/25 R, 25 E, 25 FT, 193/27, 32; 221/67, 311, 312 R

[56] References Cited

U.S. PATENT DOCUMENTS

| | | | |
|---|---|---|---|
| 4,456,147 | 6/1984 | Tominaga | 221/67 |
| 4,498,569 | 2/1985 | Tanaka et al. | 193/27 |
| 4,586,633 | 5/1986 | Holland et al. | 221/67 |

FOREIGN PATENT DOCUMENTS 58-16519 3/1983 Japan .
40791 2/1990 Japan ................ 221/312 R Primary Examiner—Joseph E. Valenza
Attorney, Agent, or Firm—Kenjiro Hidaka

[57] ABSTRACT

A serpentine-type merchandise storing and dispensing column used for an automatic vending machine has a pair of opposing, generally vertically disposed wave-formed walls forming a serpentine merchandise storing space therebetween. Each wall includes a plurality of arcuate boards pivotally coupled to a frame and are disposed generally vertically in succession. The arcuate boards of one wall are disposed in a staggered arrangement with respect to the levels of the arcuate boards of the opposing wall. Each arcuate board is urged by a tension-spring so as to pivotally swing into the serpentine merchandise storing space. Thus, the board cushions descending merchandise in the serpentine merchandise storing space. Each arcuate board has a plurality of vibration absorbing slots and a plurality of beads between, and in parallel with, the slots.

2 Claims, 3 Drawing Sheets

SERPENTINE-TYPE MERCHANDISE STORING AND DISPENSING COLUMN FOR AUTOMATIC VENDING MACHINE

BACKGROUND OF THE INVENTION

1. Field of the Invention

This invention relates to a serpentine-type merchandise storing and dispensing column used for an automatic vending machine.

2. Description of the Prior Art

A conventional serpentine-type merchandise storing and dispensing column used in an automatic vending machine has a pair of opposing, generally vertically disposed wave-formed walls. The serpentine space between the wave-formed walls constitutes the space for storing the merchandise such as canned or bottled drinks. The merchandise is supplied from the top opening of the serpentine space and dispensed from its bottom opening, piece by piece, as the customer operates the vending machine.

Japanese published patent application, 58-16519, published Mar. 31, 1983, which is owned by the assignee of the present invention, discloses such a serpentine-type merchandise storing and dispensing column. In this disclosure, two sets of arcuate boards are disposed in succession generally vertically, opposing each other, in a staggered arrangement so that a serpentine space is formed between the two sets of the arcuate boards. Both the top edges and the bottom edges of the arcuate boards are fixedly supported. An improvement in this disclosure is that at least one vertical set of the arcuate boards is made horizontally movable towards or away from the other set so that the serpentine space therebetween may be narrowed or widened, respectively, to adjust to the size of the merchandise.

One of the problems pertaining to a conventional serpentine-type merchandise storing and dispensing column is the fact that the customer hears an unpleasant rattling sound from inside the vending machine as a piece of the merchandise is dispensed from the machine and the remaining pieces descend in the serpentine space, colliding with each other and/or with the wave-formed walls. Similar undesirable sound is created when the merchandise is supplied into the machine.

Another problem pertaining to a conventional serpentine-type merchandise storing and dispensing column is that a tendency of sticking of the merchandise to the arcuate boards, particularly when the vending machine is of a refrigerated type.

SUMMARY OF THE INVENTION

In view of the above, it is the primary object of the present invention to provide an improved serpentine-type merchandise storing and dispensing column for an automatic vending machine with which the intensity of the rattling sound, caused by the descending merchandise therein, is minimized.

Another object of the present invention is to provide an improved serpentine-type merchandise storing and dispensing column with which the merchandise therein can be observed easily from outside the column.

A further object of the present invention is to provide an improved serpentine-type merchandise storing and dispensing column with which the merchandise therein can efficiently be refrigerated when the column is used in a refrigerated vending machine.

An additional object is to minimize the sticking problem of the merchandise particularly in a refrigerated-type vending machine.

In order to achieve the above objects, the serpentine-type merchandise storing and dispensing column of the present invention has a pair of opposing, generally vertically disposed wave-formed walls forming a serpentine merchandise storing space therebetween. Each wall includes a plurality of arcuate boards pivotally coupled to a frame and are disposed generally vertically in succession. The arcuate boards of one wall are disposed in a staggered arrangement with respect to the levels of the arcuate boards of the opposing wall. Each arcuate board is urged by a tension-spring so as to pivotally swing into the serpentine merchandise storing space. Thus, the board cushions descending merchandise in the serpentine merchandise storing space, thereby minimizing the rattling sound. Each arcuate board has a plurality of vibration absorbing slots and a plurality of beads between, and in parallel with, the slots.

DETAILED DESCRIPTION OF THE PREFERRED EMBODIMENTS

Figure 1:
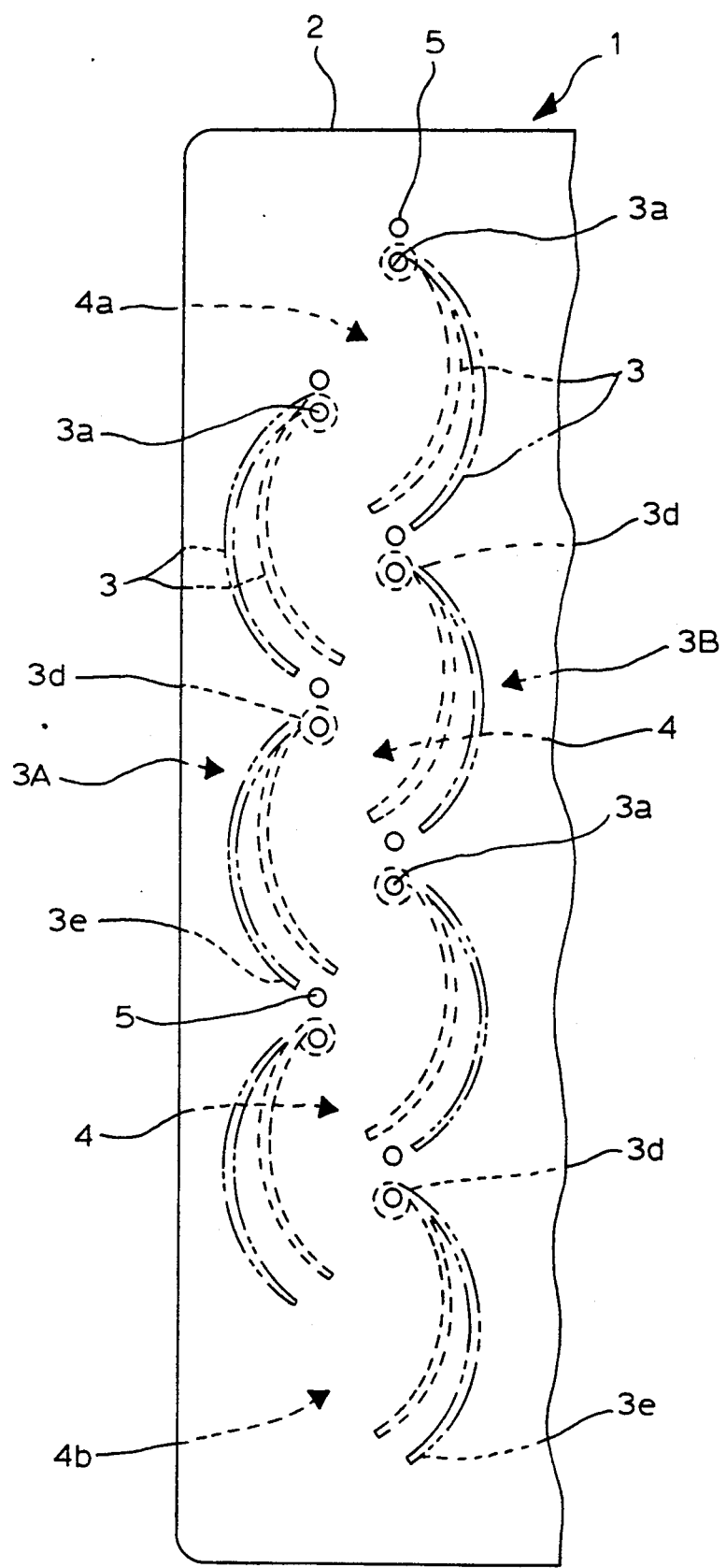
FIG. 1 is a side elevational view of the serpentine-type merchandise storing and dispensing column of the present invention.
Figure 2:
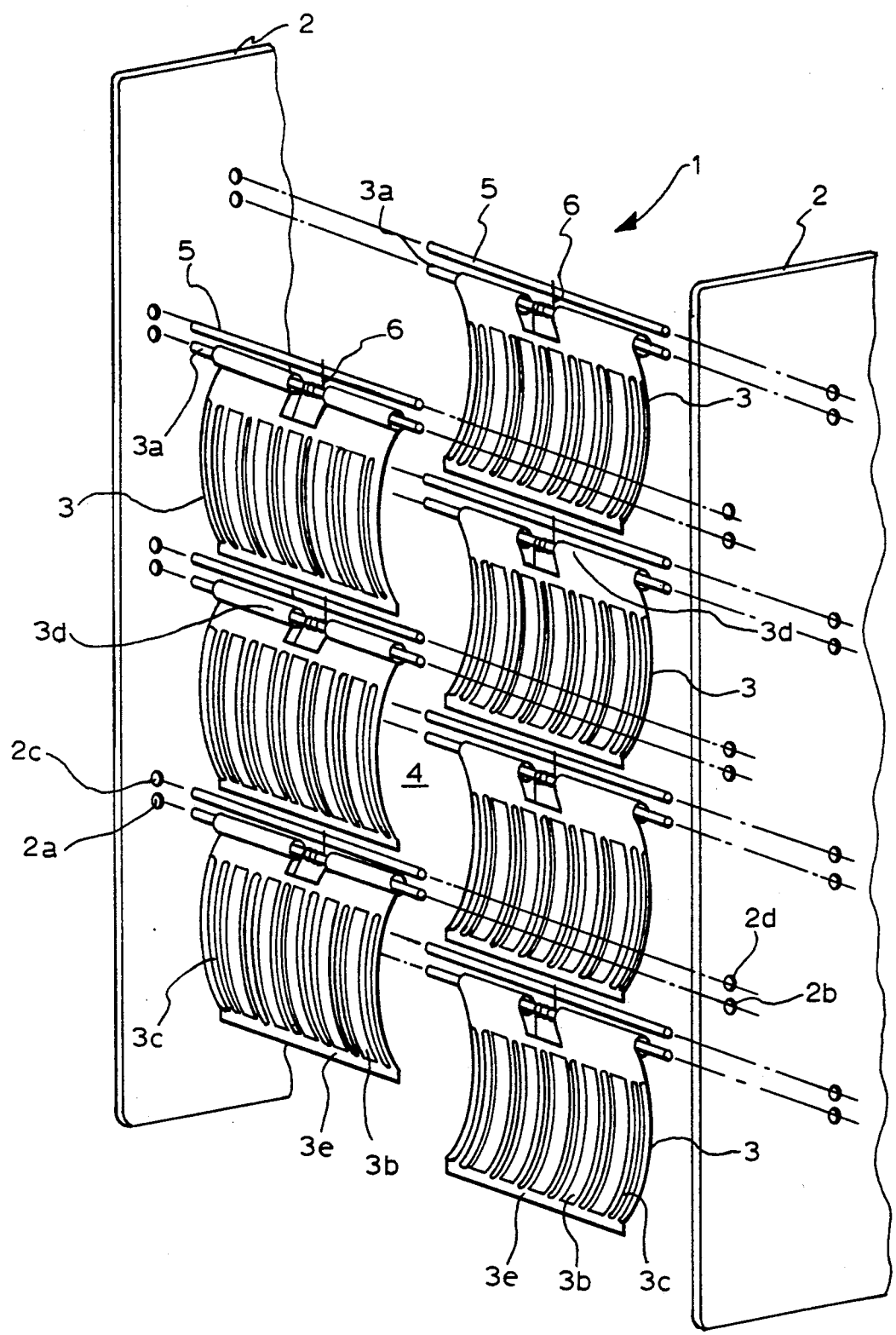
FIG. 2 is a disassembled perspective view of the serpentine-type merchandise storing and dispensing column shown in FIG. 1.

Referring to FIGS. 1 and 2, numeral 1 denotes a serpentine-type merchandise storing and dispensing column of the present invention used for a vending machine. The left-hand side, as viewed in FIGS. 1 and 2, is the front side of the vending machine. Numeral 2 denotes a pair of side frames opposing each other. Numeral 3 denotes a plurality of arcuate boards. The arcuate boards 3 are separated into two groups. One group is disposed in front of the other group and the two groups are opposing each other. Each group has a plurality of the boards 3 disposed generally vertically in succession in a wave-formed form, when seen from either side, as shown in FIG. 1. The curving direction of the arcuate boards 3 of one group is in the manner that both the top and the bottom ends thereof are bent towards the boards 3 of the other group, as shown in FIG. 1. Thus, the two groups of the arcuate boards 3 constitute a pair of generally vertically disposed wave-formed walls 3A and 3B, the front and the rear, respectively, opposing each other.

Numeral 3a denotes horizontal shafts which are disposed across the side frames 2 and coupled to the side frames 2 in holes 2a, 2b thereof. The shafts 3a are also separated into two groups, the front and the rear, corresponding to the two groups of the boards 3. The shafts 3a of one group are vertically aligned one another and disposed vertically shifted by approximately one-half of the vertical shaft-to-shaft spacing with respect to the levels of the opposing shafts 3a of the other group, as seen in FIG. 1.

Each of the boards 3 is pivotally mounted on one of the shafts 3a in the top end 3d, i.e. the top edge, of the board. The opposite end 3e, i.e. the bottom edge, of the board is free and unsupported. Therefore, the boards 3 of one group are also disposed vertically shifted by approximately one-half length of the height of the board with respect to the levels of the opposing boards 3 of the other group. Thus, a vertically extending serpentine merchandise storing space 4 is formed between the two groups of the boards 3, as seen in FIG. 1. The serpentine merchandise storing space 4 has a top opening 4a and a bottom opening 4b for accepting and dispensing, respectively, the merchandise, such as canned or bottled drinks, therethrough. Accordingly, the serpentine merchandise storing space 4 is a passage way for the merchandise as well as a storing space. When the merchandise is supplied through the top opening 4a, or a piece of merchandise is dispensed through the bottom opening 4b, the supplied merchandise or the remaining merchandise descends for itself by gravity through the serpentine merchandise storing space 4. The horizontal depth (or horizontal width, as viewed in FIG. 1) of the merchandise storing space 4 is properly determined according to the width of the merchandise, or the diameter of the merchandise, if canned or bottled merchandise, to enable the merchandise to smoothly descend through the space without being caught therein.

Referring to FIG. 2, numeral 6 denotes coiled tension-springs. Each of the arcuate boards 3 has a coiled tension-spring 6 which is mounted on the corresponding shaft 3a, and the tension-spring 6 urges the arcuate board 3 so that the board 3 slightly rotates about the shaft 3a and pivotally swings into the merchandise storing space 4, i.e. towards the opposing arcuate boards, thereby causing the width of the serpentine merchandise storing space 4 to be narrowed, as seen in FIG. 1. Numeral 5 denotes anchoring shafts which are individually and horizontally disposed slightly above the respective shafts 3a, across the side frames 2, and coupled to the side frames 2 in holes 2c, 2d. One end of each of the tension-springs 6 is hooked to the board 3 and the other end is anchored to the anchoring shaft 5.

Figure 3:
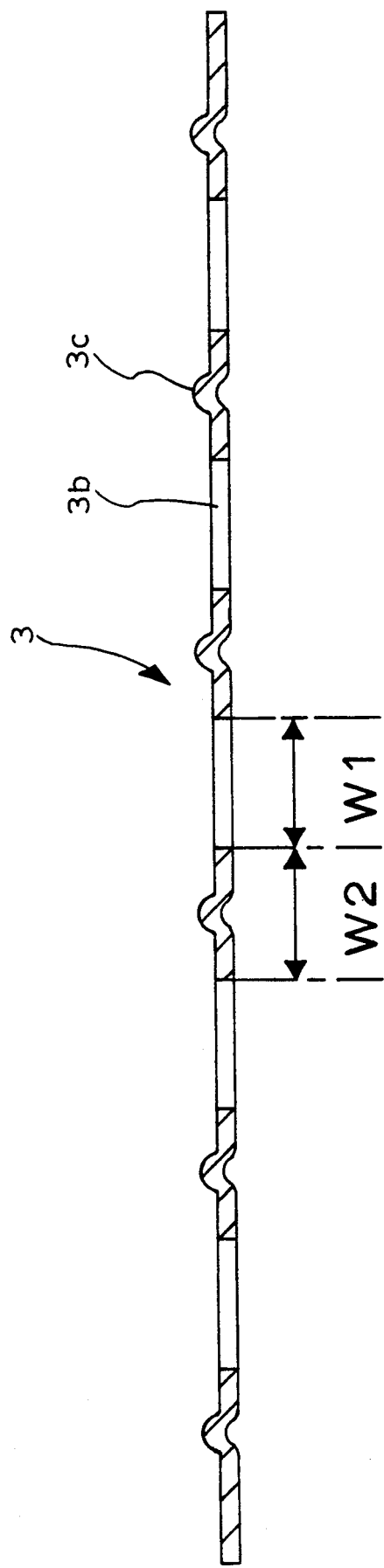
FIG. 3 is a sectional view of an arcuate board employed in the serpentine-type merchandise storing and dispensing column of the present invention, as the board is cut horizontally in the middle part thereof.

FIG. 3 is a sectional view of a arcuate board 3, as the board 3 is cut horizontally in the middle part thereof. Referring to FIGS. 2 and 3, each of the arcuate boards 3 has a plurality of vibration absorbing slots 3b formed along the curvature of the board 3 in parallel with each other and in substantially the vertical direction. The slots 3b are disposed over nearly the entire area of the board 3. Between the slots 3b are disposed beads 3c which extend in parallel with the slots 3b. The width ("W1" in FIG. 3) of each slot 3b and the width ("W2" in FIG. 3) between two adjacent slots are substantially equal in this embodiment.

The slots 3b absorb the vibration of the boards 3 when the merchandise collides with the boards as the merchandise drops or descends in the serpentine merchandise storing space 4. Furthermore, since the slots 3b cause the mass of each board 3 to decrease, the intensity of the undesirable sound created by the board 3 is minimized.

The beads 3c not only add structural strength to the boards 3 but also minimize the tendency of sticking of the merchandise to the boards, particularly when the vending machine employing the column 1 is of a refrigerated type.

As mentioned above, the boards 3 are pivotally coupled to the frames 2 and are urged by the springs 6 so as to swing into the merchandise storing space 4. Therefore, when the merchandise collides with the arcuate boards 3, as the merchandise drops or descends in the merchandise storing space 4, the boards 3 cushion the descending merchandise, thereby damping the shocks of the collision between the merchandise and the boards. In other words, the boards 3 function as shock absorbers. This shock damping effect also causes the intensity of the sound created by the collision between the merchandise and the boards to be minimized.

Other advantages of the present invention are that the merchandise in the merchandise storing space 4 can be observed through the slots 3b of the boards 3 and that the merchandise can efficiently be refrigerated when the column 1 is used in a refrigerated vending machine because the slots 3b allow the circulating refrigerated air to pass therethrough to directly reach the merchandise.

The above detailed description is made for one unit of the serpentine-type merchandise storing and dispensing column 1 of the present invention. A plurality of identical or similar columns may actually be employed in a vending machine. In that case, a plurality of the columns may be disposed side by side and/or one behind another in the vending machine, according to the type and capacity of the vending machine and the kind of the merchandise.

It will be understood that various changes and modifications may be made in the above described embodiment which provides the characteristics of the present invention without departing from the spirit and principle thereof particularly as defined in the following claims.

What is claimed is:

1. A serpentine-type merchandise storing and dispensing column for an automatic vending machine, the column having a serpentine merchandise storing space therein, comprising:
   (a) a frame;
   (b) a plurality of first arcuate boards pivotally coupled to said frame and being disposed generally vertically in succession,
      each of said first arcuate boards being urged by a first spring so that the urged first board pivotally swings into the serpentine merchandise storing space,
      each of said first arcuate boards having a plurality of first vibration absorbing slots, said first vibration absorbing slots being disposed over nearly the entire area of said first arcuate boards, the width of each first vibration absorbing slot being nearly equal to the width between any two of said first vibration absorbing slots adjacent to each other,
      said first arcuate boards constituting a first waveformed wall generally vertically disposed; and
   (c) a plurality of second arcuate boards pivotally coupled to said frame and being disposed generally vertically in succession, opposing said first arcuate boards, in a staggered arrangement with respect to the levels of said first arcuate boards,
      each of said second arcuate boards being urged by a second spring so that the urged second board pivotally swings into the serpentine merchandise storing space,
      each of said second arcuate boards having a plurality of second vibration absorbing slots, said second vibration absorbing slots being disposed over nearly the entire area of said second arcuate boards, the width of each second vibration absorbing slot being nearly equal to the width between any two of said second vibration absorbing slots adjacent to each other, said second arcuate boards constituting a second wave-formed wall generally vertically disposed, said first wave-formed wall and said second wave-formed wall forming the serpentine merchandise storing space therebetween.

2. A serpentine-type merchandise storing and dispensing column for an automatic vending machine, the column having a serpentine merchandise storing space therein, comprising:

(a) a frame;

(b) a plurality of first arcuate boards pivotally coupled to said frame and being disposed generally vertically in succession, each of said first arcuate boards being urged by a first spring so that the urged first board pivotally swings into the serpentine merchandise storing space, each of said first arcuate boards having a plurality of first vibration absorbing slots, each of said first arcuate boards having a plurality of first beads disposed between, and in parallel with, said first vibration absorbing slots, said first arcuate boards constituting a first wave-formed wall generally vertically disposed; and (c) a plurality of second arcuate boards pivotally coupled to said frame and being disposed generally vertically in succession, opposing said first arcuate boards, in a staggered arrangement with respect to the levels of said first arcuate boards, each of said second arcuate boards being urged by a second spring so that the urged second board pivotally swings into the serpentine merchandise storing space, each of said second arcuate boards having a plurality of second vibration absorbing slots, each of said second arcuate boards having a plurality of second beads disposed between, and in parallel with, said second vibration absorbing slots, said second arcuate boards constituting a second wave-formed wall generally vertically disposed, said first wave-formed wall and said second wave-formed wall forming the serpentine merchandise storing space therebetween.

* * * * *